US012247713B2

(12) United States Patent
Nakashima

(10) Patent No.: US 12,247,713 B2
(45) Date of Patent: Mar. 11, 2025

(54) LIGHTING TOOL FOR VEHICLE

(71) Applicant: STANLEY ELECTRIC CO., LTD., Tokyo (JP)

(72) Inventor: Daisuke Nakashima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/763,008

(22) Filed: Jul. 3, 2024

(65) Prior Publication Data

US 2025/0012418 A1 Jan. 9, 2025

(51) Int. Cl.

*F21S 41/24* (2018.01)
*F21S 41/148* (2018.01)
*F21S 41/32* (2018.01)

(52) U.S. Cl.

CPC ............ *F21S 41/24* (2018.01); *F21S 41/148* (2018.01); *F21S 41/32* (2018.01)

(58) Field of Classification Search

CPC .......... F21S 41/24; F21S 41/148; F21S 41/32; F21S 41/285; F21S 43/26; F21S 43/315; F21S 43/40; F21S 41/147; F21S 43/14; F21V 13/04

See application file for complete search history.

(56) References Cited

U.S. PATENT DOCUMENTS

2019/0078747 A1* 3/2019 Wu .................... G02B 27/0905
2021/0102681 A1* 4/2021 Sato ........................ F21S 43/14

FOREIGN PATENT DOCUMENTS

JP 2016-085827 A 5/2016
JP 2021-190342 A 12/2021
KR 20190062732 A * 6/2019

OTHER PUBLICATIONS

Search English translation of KR-20190062732-A (Year: 2019).*

* cited by examiner

*Primary Examiner* — Omar Rojas Cadima
(74) *Attorney, Agent, or Firm* — KENEALY VAIDYA LLP

(57) ABSTRACT

A light-guide-part has width that gradually increases from first-end toward second-end and shape in which both sides of the light-guide-part in widthwise direction having optical axis interposed between are curved toward one-direction. An incidence-part has incidence-surface located in central part of the first-end of the light-guide-part and facing light source. The incidence-surface has shape in which both sides of the incidence-surface in the widthwise direction having the optical axis interposed between are curved toward the one-direction, curved in concave shape when the light-guide-part is seen from the one-direction, and curved in convex shape in cross section in thickness direction of the light-guide-part parallel to the optical axis. A reflecting-part has reflecting-surface inclined toward the one-direction on the second-end of the light-guide-part. The reflecting-surface has shape in which both sides of the reflecting-surface in the widthwise direction having the optical axis interposed between are curved toward the one-direction.

7 Claims, 13 Drawing Sheets

1

LIGHTING TOOL FOR VEHICLE

CROSS-REFERENCE TO RELATED APPLICATION

Priority is claimed on Japanese Patent Application No. 2023-111792, filed Jul. 6, 2023, the content of which is incorporated herein by reference.

BACKGROUND OF THE INVENTION

Field of the Invention

The present invention relates to a lighting tool for a vehicle.

Description of Related Art

In the related art, as a lighting tool for a vehicle mounted on a vehicle, there is known a configuration in which a light source such as a light emitting diode (LED) or the like and a light guide body such as an inner lens or the like are combined (for example, see Japanese Unexamined Patent Application, First Publication No. 2016-85827 and Japanese Unexamined Patent Application, First Publication No. 2021-190342).

In such a lighting tool for a vehicle, light emitted from the light source enters the inside of the light guide body through an incidence surface of the light guide body, and while being guided inside the light guide body, the light is emitted to the outside of the light guide body from an emitting surface of the light guide body. Accordingly, it is possible to emit light using the emitting surface of the light guide body as the emission surface of the lighting tool for a vehicle.

SUMMARY OF THE INVENTION

Incidentally, the LEDs mentioned above have high directionality (straightness) but also have characteristics (Lambertian characteristics) such as low light diffusion. For this reason, in the lighting tool for a vehicle, due to a luminance difference between an optical axis of the light emitted from the vicinity of the light source and its surroundings, a portion of the emitting surface (emission surface) of the light guide body that corresponds to the optical axis of the LED appears to shine brighter than the vicinity of the surrounding portions, which is also known as luminance (emission) non-uniformity.

On the other hand, in the lighting tool for a vehicle in the related art, a plurality of reflection cuts are provided in the light guide body, and while the light reflected by the plurality of reflection cuts is guided toward the emitting surface, the light is diffused by light distribution control of the plurality of reflection cuts, thereby obtaining uniform emission with little luminance (emission) non-uniformity at the emitting surface of the light guide body.

However, when point emission light emitted from the light source is guided inside the light guide body and surface emission is performed from the emitting surface of the light guide body, in a configuration in which light distribution of the light is controlled by the above-mentioned plurality of reflection cuts, light whose light distribution is not controlled may leak out to the outside as stray light between the plurality of reflection cuts.

In this case, when the emitting surface of the light guide body is viewed from a direction other than the front, the luminance (emission) non-uniformity caused by the stray light described above occurs, which deteriorates the appearance of the lighting tool for a vehicle, especially when it is turned on. In addition, management of processing (yield) is required.

Meanwhile, when another part such as a light diffusion member is added to eliminate the occurrence of luminance (emission) non-uniformity, the cost will increase due to the increase in the number of parts.

An aspect of the present invention is directed to providing a lighting tool for a vehicle capable of emitting more uniform light by eliminating a luminance difference between the vicinity of an optical axis of light emitted from a light source and its surroundings, without using a plurality of reflection cuts.

An aspect of the present invention provides the following configurations.

(1) A lighting tool for a vehicle including:

a light source;

a light guide part configured to guide light emitted from the light source from a first end located on one end side to a second end located on the other end side;

an incidence part configured to cause the light emitted from the light source to enter inside of the light guide part from the first end of the light guide part; and a reflecting part configured to reflect light guided toward the second end of the light guide part in one direction substantially perpendicular to an optical axis of the light emitted from the light source, wherein the light guide part has a width that gradually increases from the first end toward the second end and a shape in which both sides of the light guide part in a widthwise direction having the optical axis interposed between are curved toward the one direction, the incidence part has an incidence surface located in a central part of the first end of the light guide part and facing the light source, the incidence surface has a shape in which both sides of the incidence surface in the widthwise direction having the optical axis interposed between are curved toward the one direction, curved in a concave shape when the light guide part is seen from the one direction, and curved in a convex shape in a cross section in a thickness direction of the light guide part parallel to the optical axis, the reflecting part has a reflecting surface inclined toward the one direction on the second end of the light guide part, and the reflecting surface has a shape in which both sides of the reflecting surface in the widthwise direction having the optical axis interposed between are curved toward the one direction.

(2) The lighting tool for a vehicle according to the above-mentioned (1), wherein the light guide part has a shape, a thickness of which gradually increases from the first end toward the second end, and the reflecting surface has a shape curved in a convex shape in a cross section in the thickness direction of the reflecting part parallel to the optical axis.

(3) The lighting tool for a vehicle according to the above-mentioned (1), including a light guide body including the light guide part, the incidence part and the reflecting part, wherein the light guide body includes a light guide part configured to guide the light reflected by the reflecting part in the one direction, and an emitting part configured to emit the light guided in the one direction to outside of the light guide part.

(4) The lighting tool for a vehicle according to the above-mentioned (3), wherein the emitting part has a flat emitting surface perpendicular to the one direction.

(5) The lighting tool for a vehicle according to the above-mentioned (3), including a plurality of emission units including the light sources and the light guide bodies, wherein the plurality of emission units are arranged side by side in the widthwise direction, and have a structure in which the adjacent light guide bodies are connected to each other.

(6) The lighting tool for a vehicle according to the above-mentioned (1), including:

a light guide body including the light guide part and the incidence part; and a reflector that configures the reflecting part, wherein the reflector has the reflecting surface facing the second end of the light guide part.

(7) The lighting tool for a vehicle according to the above-mentioned (6), including a plurality of emission units including the light sources, the light guide bodies and the reflectors, wherein the plurality of emission unit are disposed side by side in the widthwise direction and have a structure in which adjacent light guide bodies are connected to each other and the adjacent reflectors are connected to each other.

According to the aspect of the present invention, it is possible to provide a lighting tool for a vehicle capable of emitting more uniform light by eliminating a luminance difference between the vicinity of an optical axis of light emitted from a light source and its surroundings, without using a plurality of reflection cuts.

DETAILED DESCRIPTION OF THE INVENTION

Figure 1:
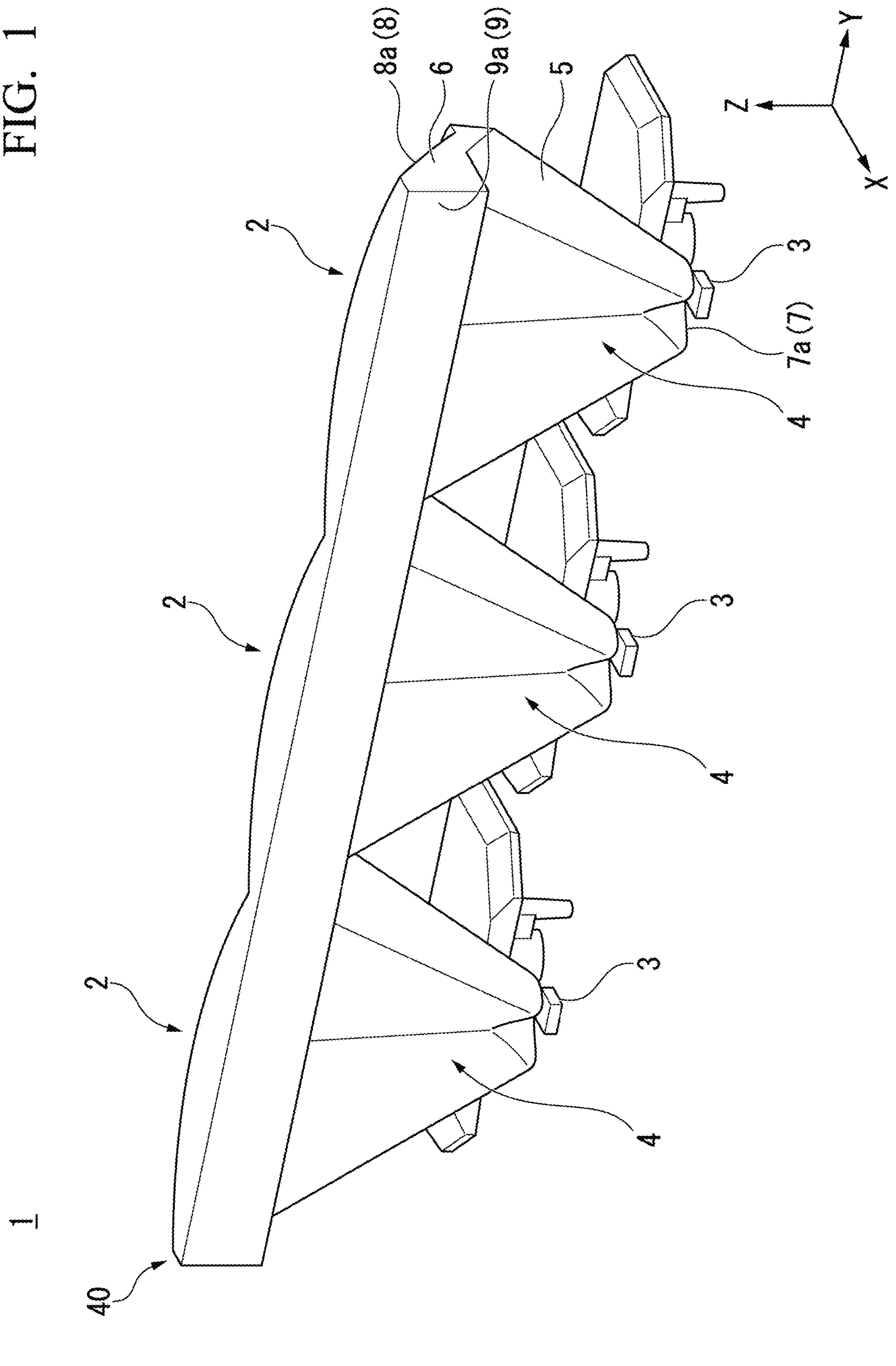
FIG. 1 is a perspective view showing a configuration of a lighting tool for a vehicle according to an embodiment of the present invention.

Hereinafter, an embodiment of the present invention will be described in detail with reference to the accompanying drawings.

Further, in the drawings used in the following description, in order to make each component easier to see, the dimensions of each component may be displayed at different scales, and dimensional ratios of each component may not necessarily be the same as actual ones.

As an embodiment of the present invention, for example, a lighting tool for a vehicle 1 shown in FIG. 1 to FIG. 17 will be described.

Figure 2:
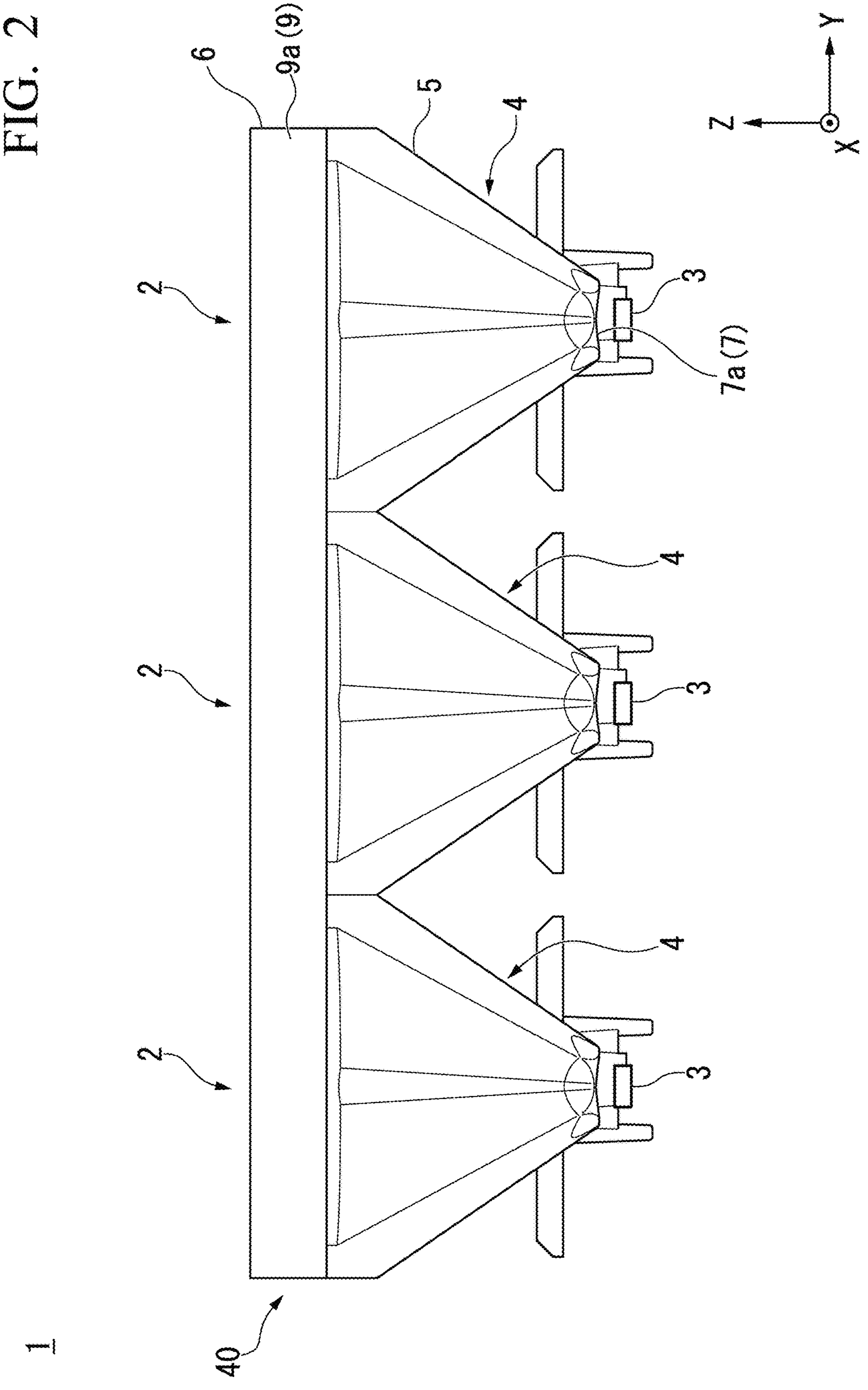
FIG. 2 is a front view showing the configuration of the lighting tool for a vehicle.
Figure 3:
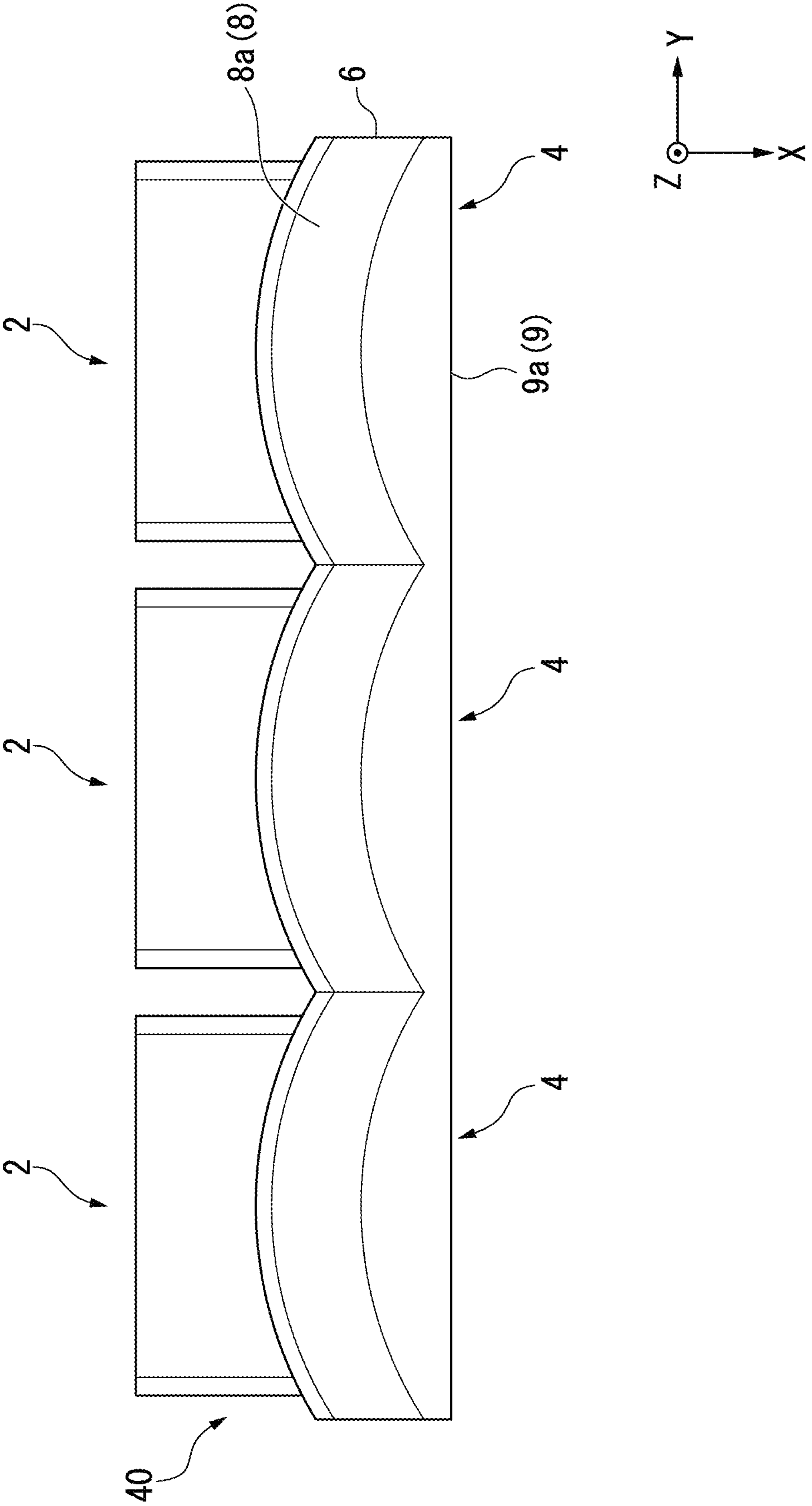
FIG. 3 is a plan view showing the configuration of the lighting tool for a vehicle.
Figure 4:
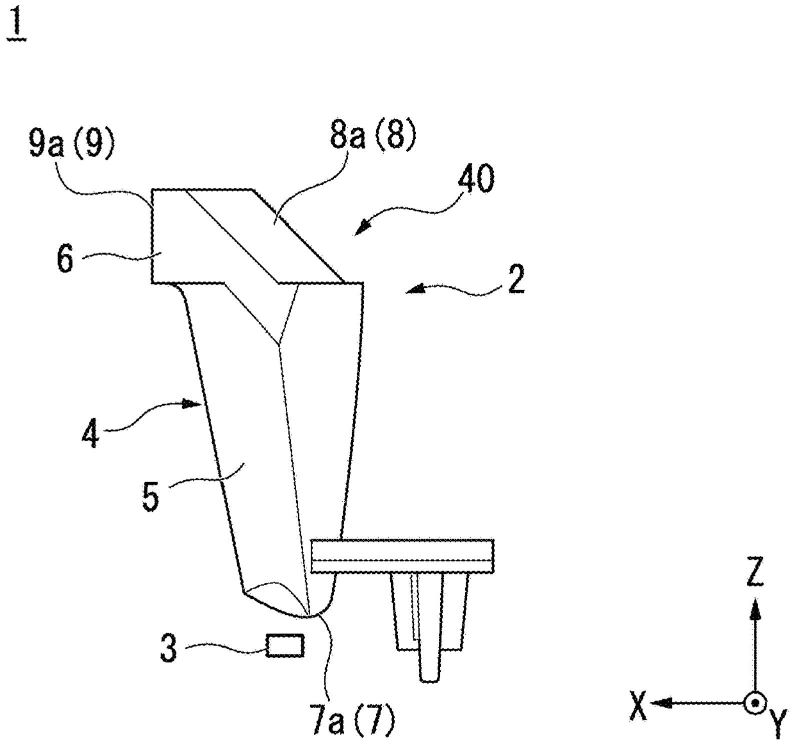
FIG. 4 is a side view showing the configuration of the lighting tool for a vehicle.
Figure 5:
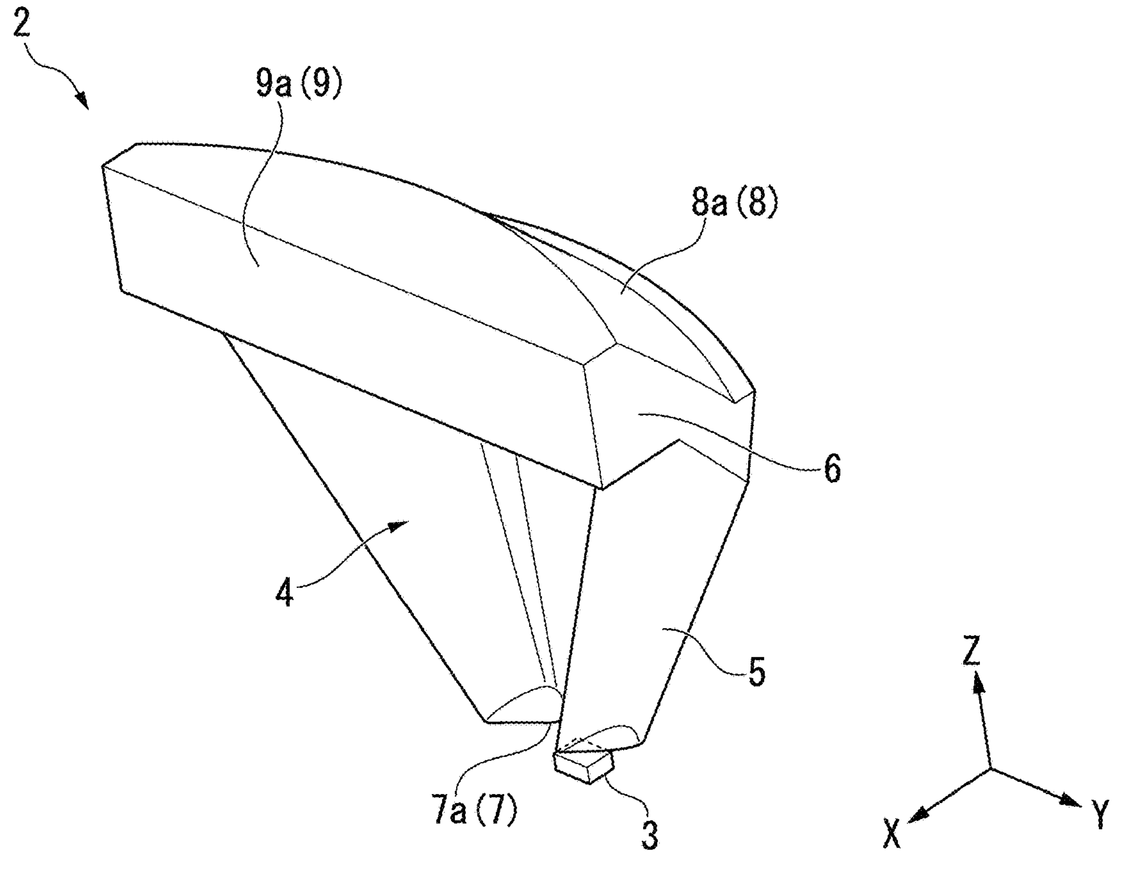
FIG. 5 is a top perspective view showing a configuration of an emission unit included in the lighting tool for a vehicle.
Figure 6:
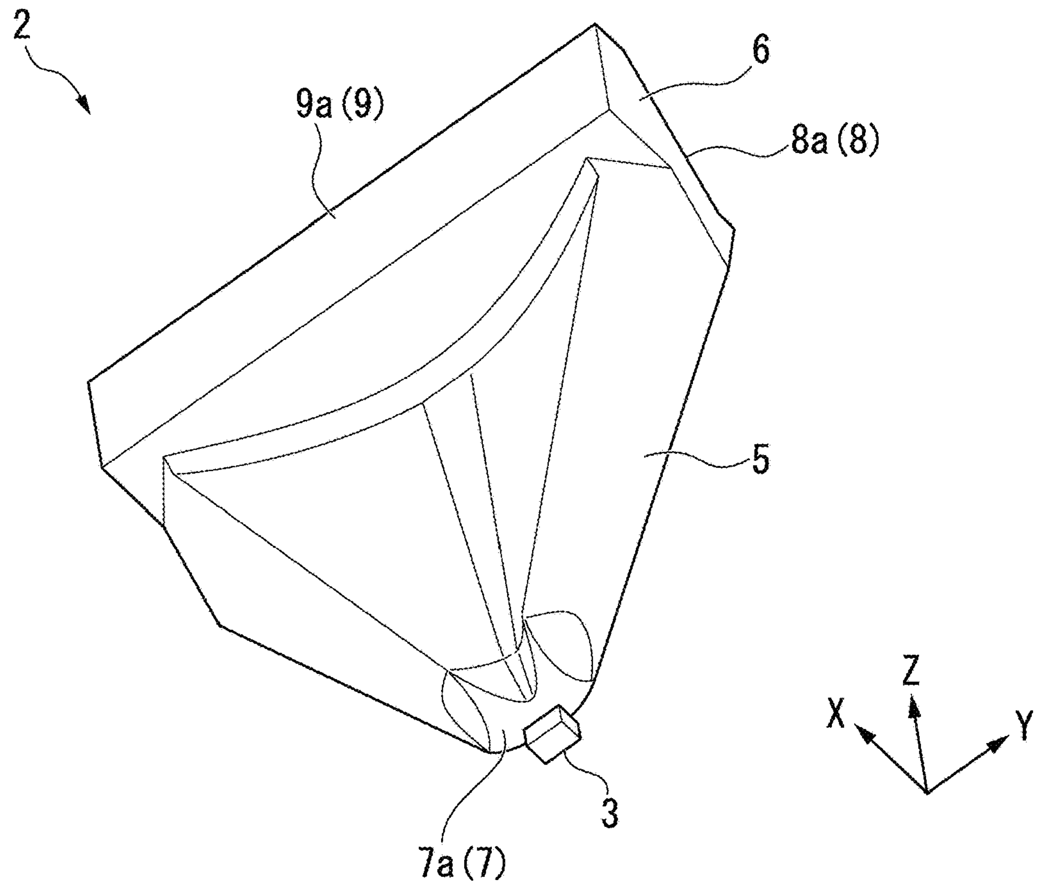
FIG. 6 is a bottom perspective view showing the configuration of the emission unit included in the lighting tool for a vehicle.
Figure 7:
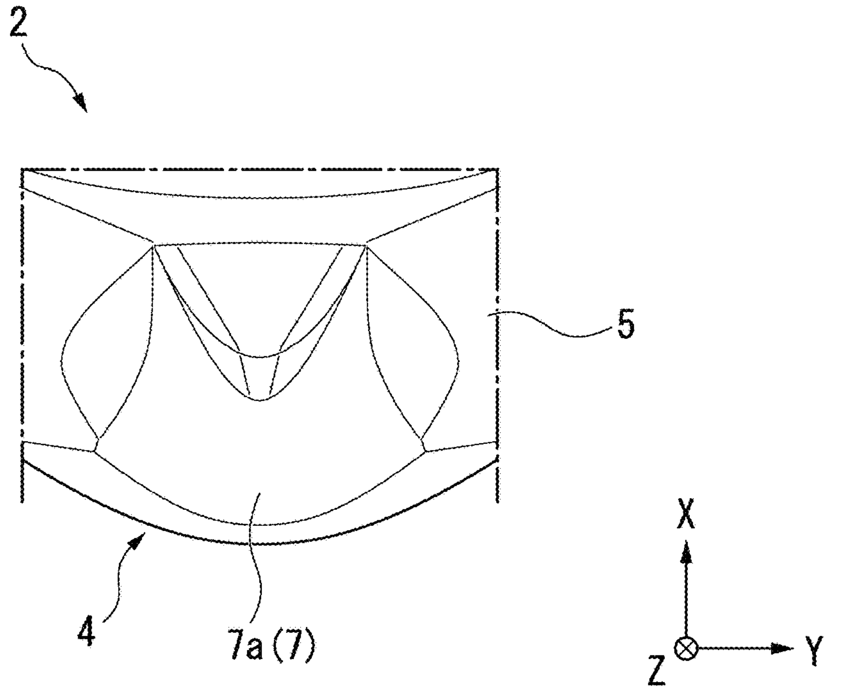
FIG. 7 is a bottom view showing a configuration of an incidence part of the emission unit.
Figure 8:
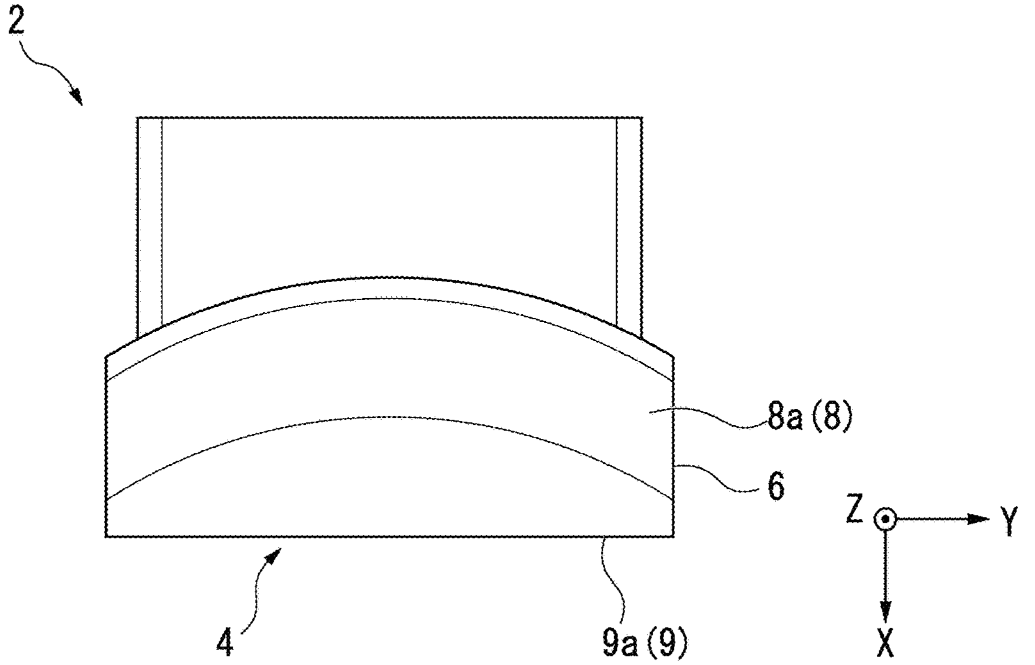
FIG. 8 is a plan view showing a configuration of a reflecting part of the emission unit.
Figure 9:
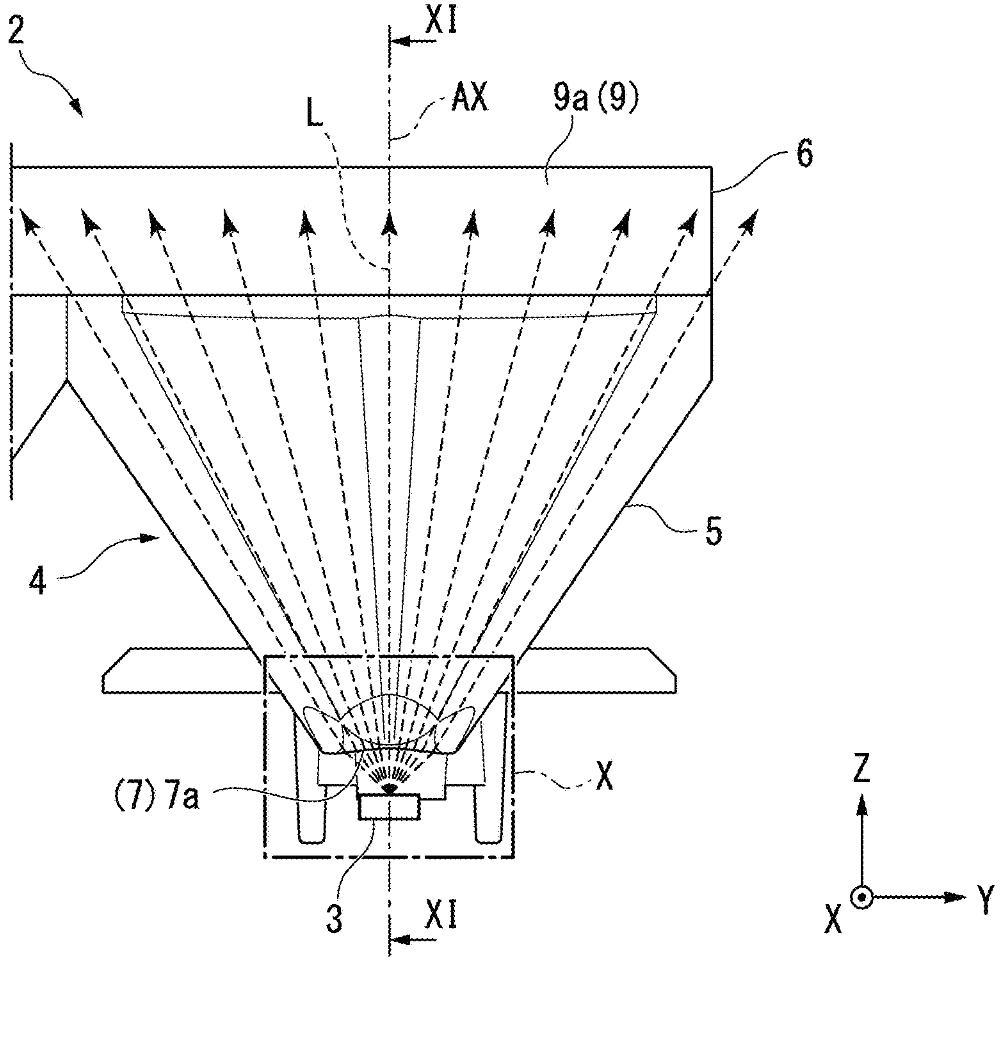
FIG. 9 is a front view showing an optical path of light entering from the incidence part of the emission unit.
Figure 10:
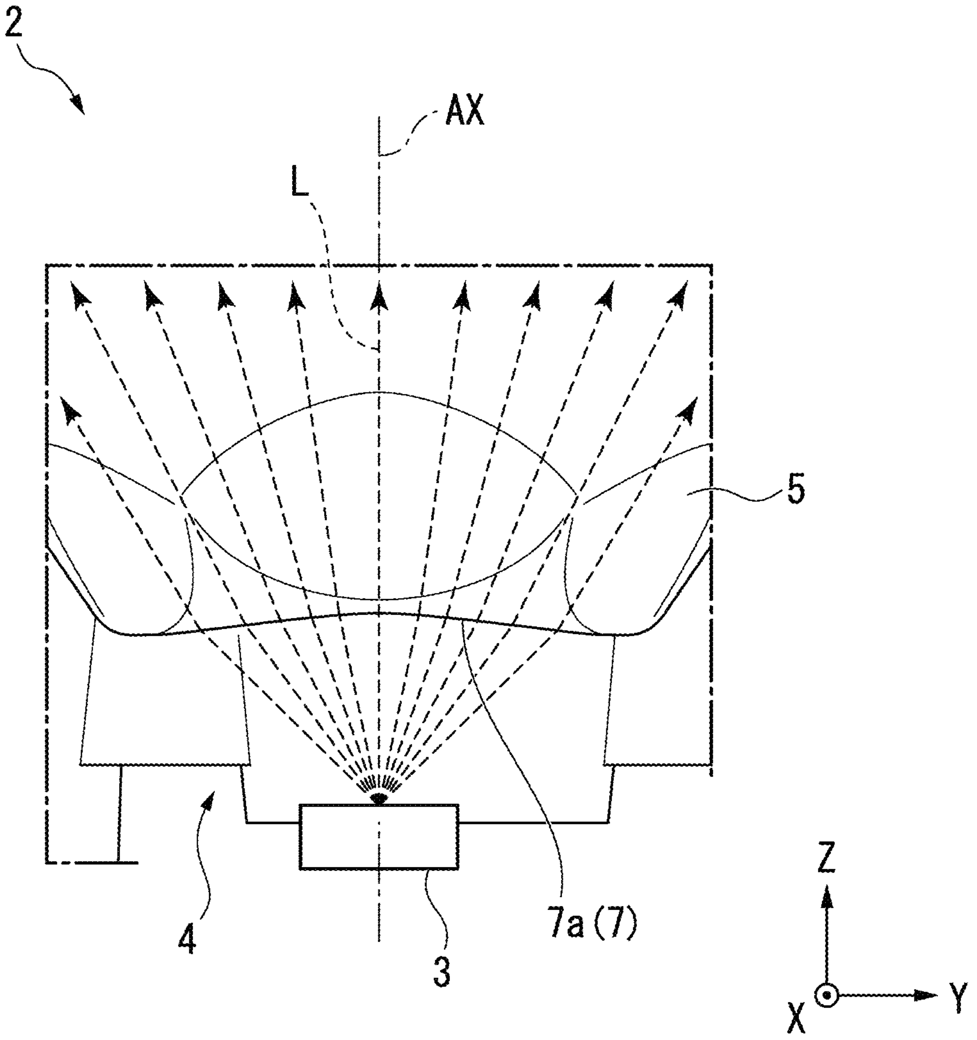
FIG. 10 is an enlarged front view of an enclosed portion X shown in FIG. 9.
Figure 11:
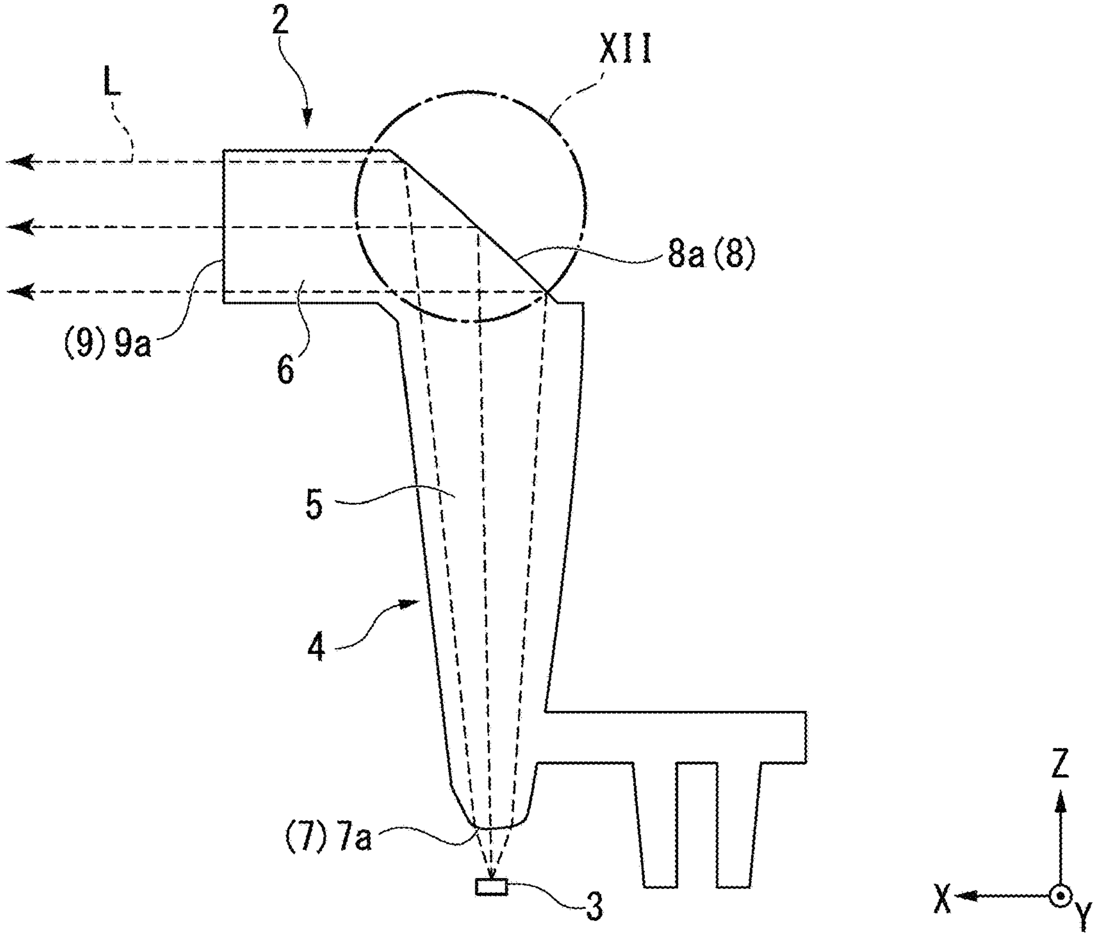
FIG. 11 is a cross-sectional view showing an optical path of light in a cross section of an emission unit 2 along line segment XI-XI shown in FIG. 9.
Figure 12:
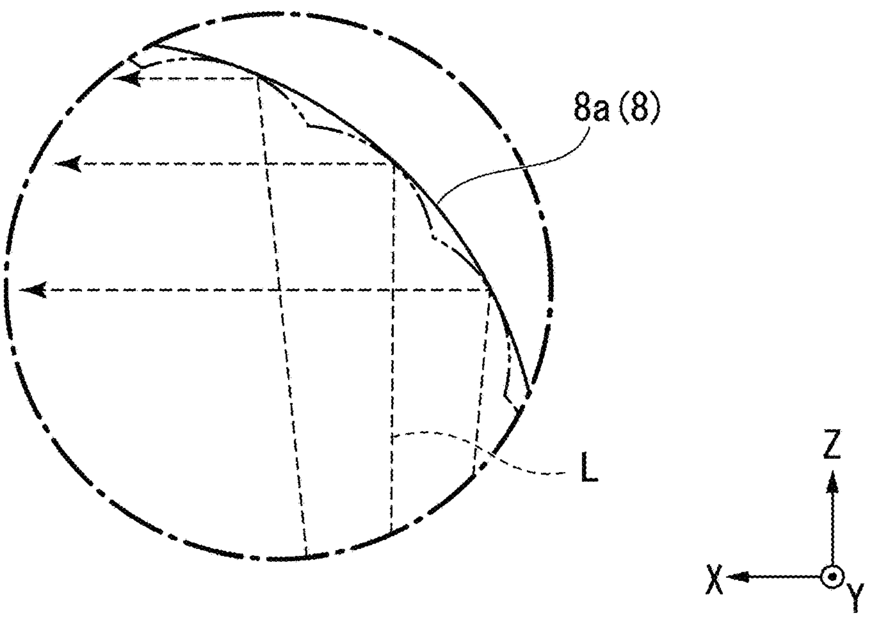
FIG. 12 is an enlarged cross-sectional view of an enclosed portion XII shown in FIG. 11.
Figure 13:
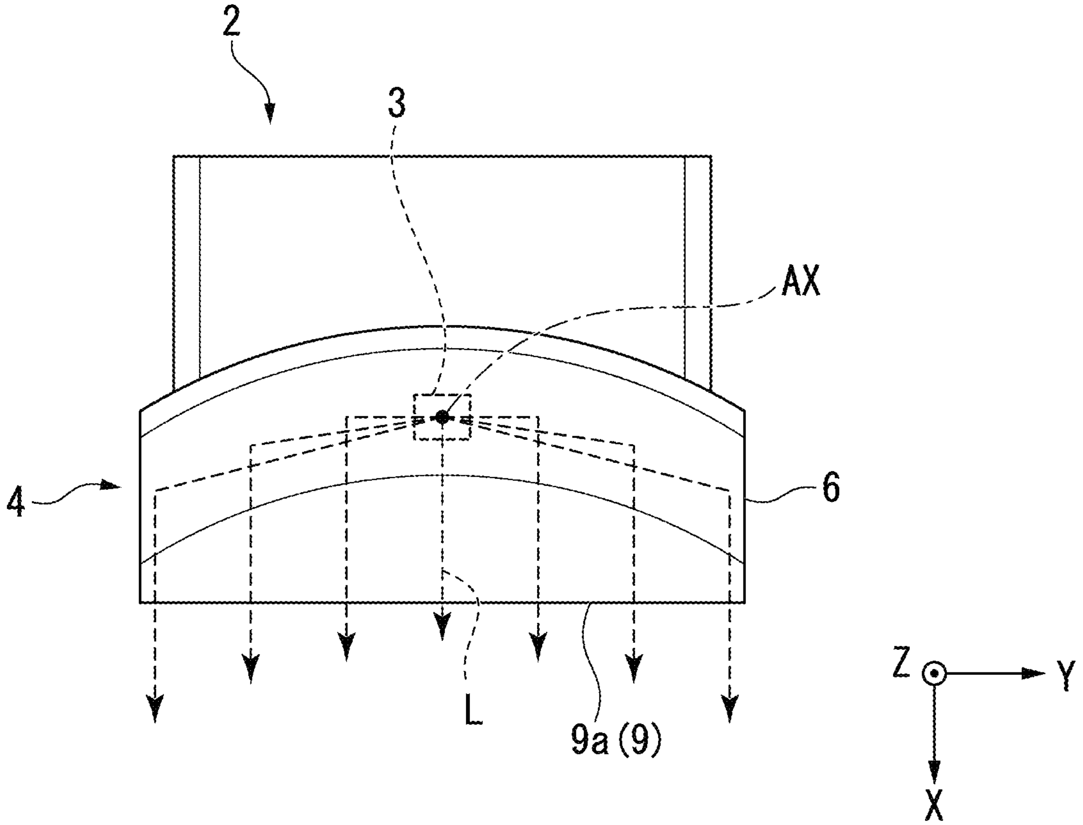
FIG. 13 is a plan view showing an optical path of light reflected by a reflecting part of the emission unit.
Figure 14:
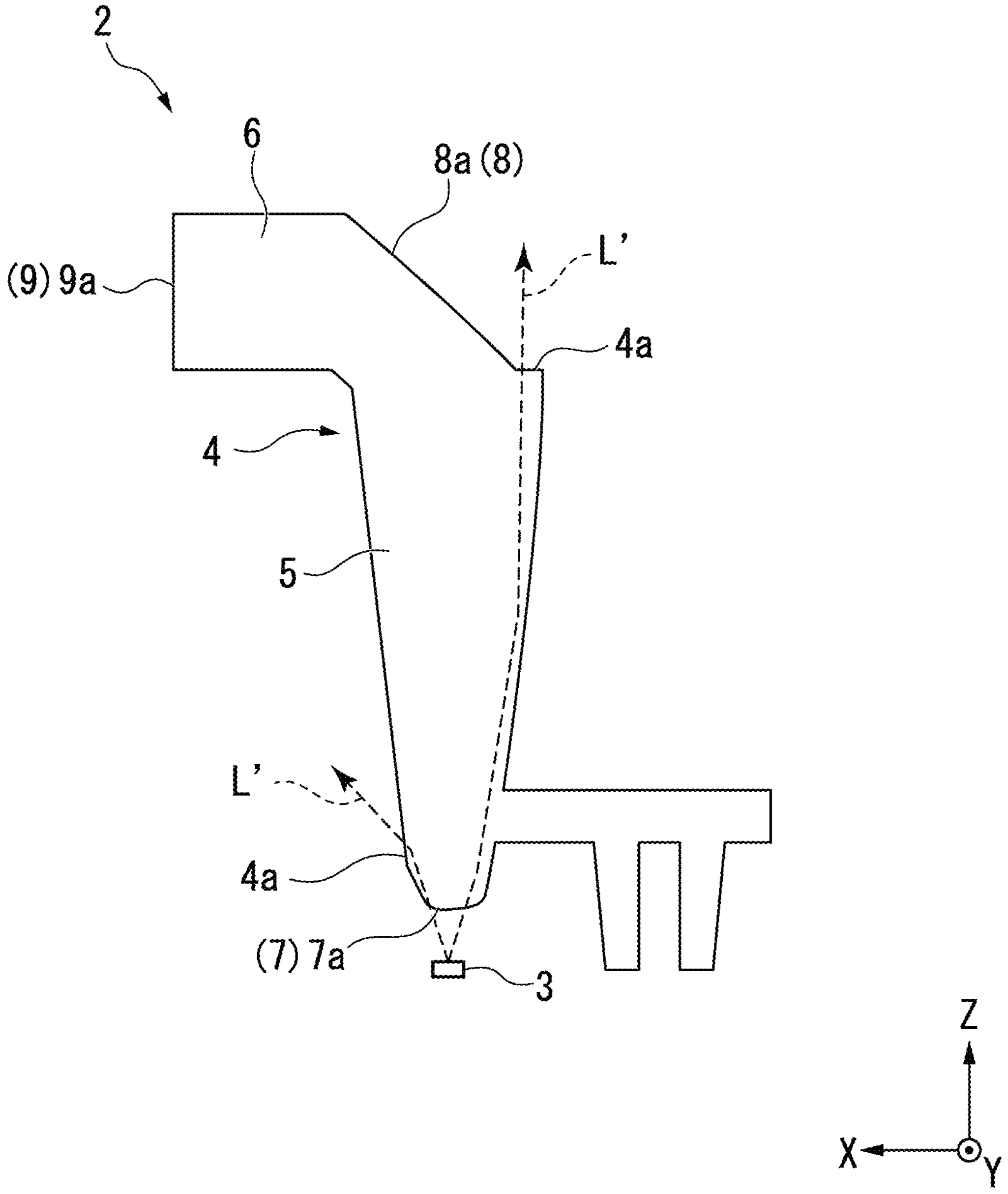
FIG. 14 is a cross-sectional view showing an optical path of stray light from the emission unit.
Figure 15:
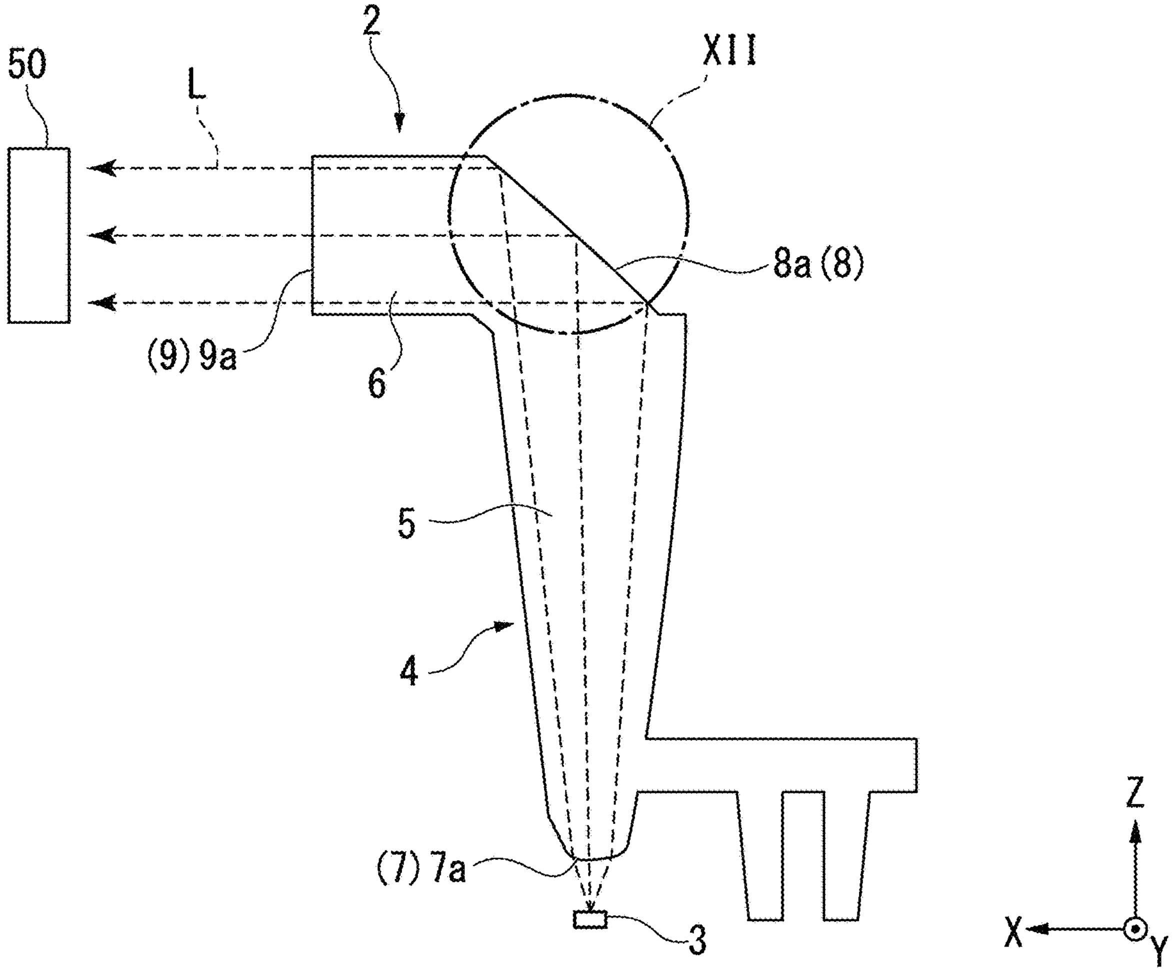
FIG. 15 is a cross-sectional view showing a variant of the lighting tool for a vehicle.
Figure 16:
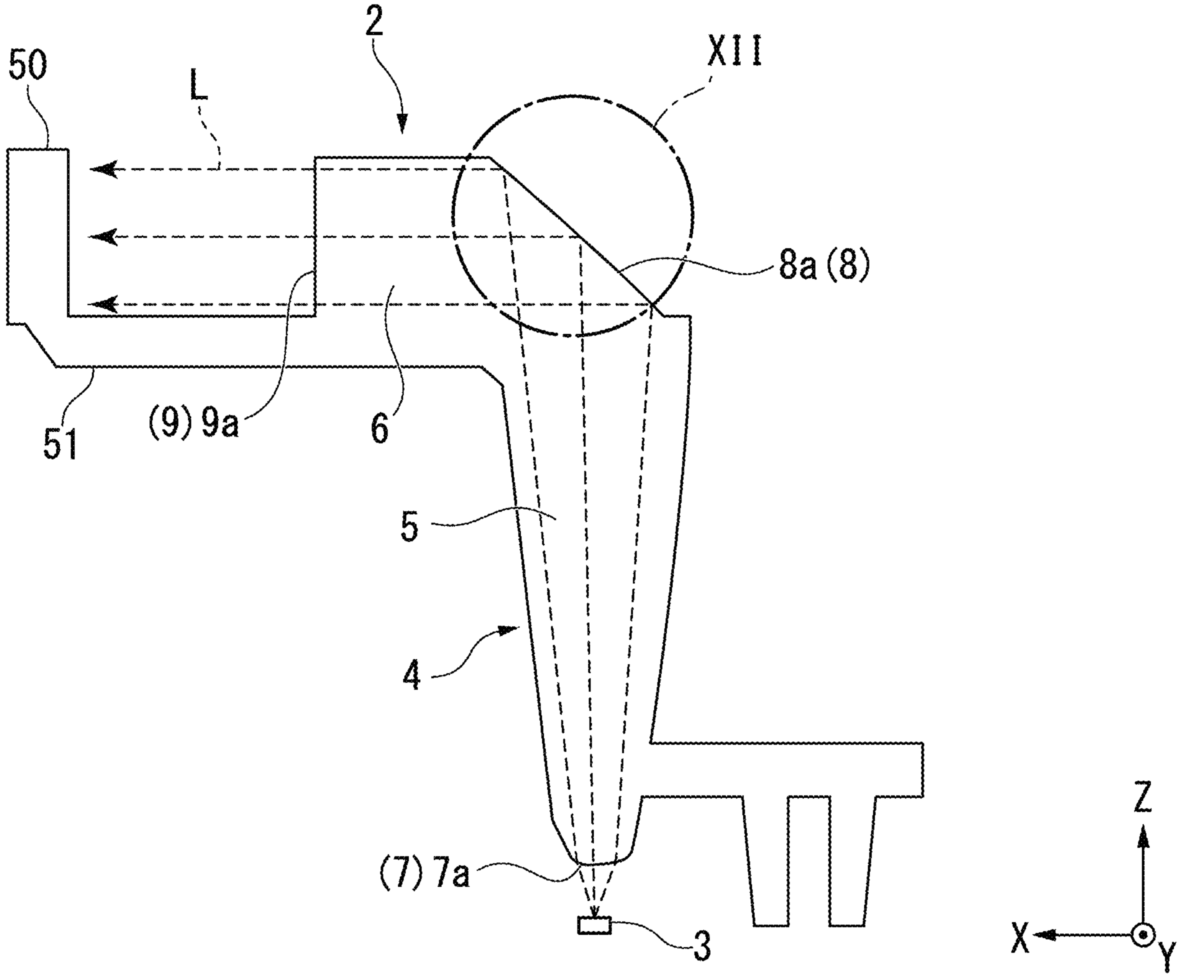
FIG. 16 is a cross-sectional view showing a variant of the lighting tool for a vehicle.
Figure 17:
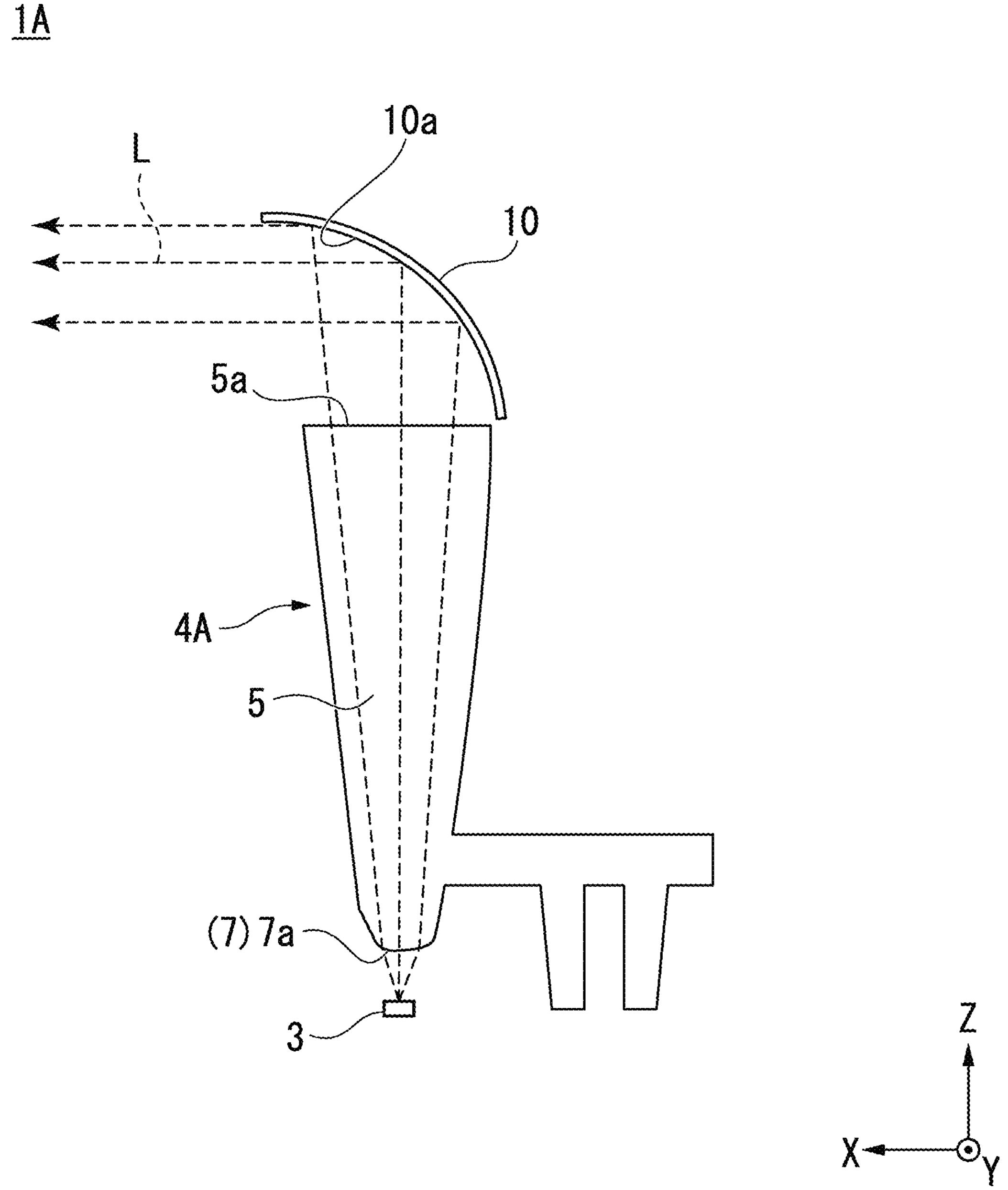
FIG. 17 is a cross-sectional view showing a configuration of another lighting tool for a vehicle.

Further, FIG. 1 is a perspective view showing a configuration of the lighting tool for a vehicle 1. FIG. 2 is a front view showing the configuration of the lighting tool for a vehicle 1. FIG. 3 is a plan view showing the configuration of the lighting tool for a vehicle 1. FIG. 4 is a side view showing the configuration of the lighting tool for a vehicle 1. FIG. 5 is a top perspective view showing a configuration of an emission unit 2 included in the lighting tool for a vehicle 1. FIG. 6 is a bottom perspective view showing a configuration of the emission unit 2 included in the lighting tool for a vehicle 1. FIG. 7 is a bottom view showing a configuration of an incidence part 7 of the emission unit 2. FIG. 8 is a plan view showing a configuration of a reflecting part 8 of the emission unit 2. FIG. 9 is a front view showing an optical path of light L entering from the incidence part 7 of the emission unit 2. FIG. 10 is an enlarged front view of an enclosed portion X shown in FIG. 9. FIG. 11 is a cross-sectional view showing an optical path of the light L in a cross section of the emission unit 2 along line segment XI-XI shown in FIG. 9. FIG. 12 is an enlarged cross-sectional view of an enclosed portion XII shown in FIG. 11. FIG. 13 is a plan view showing an optical path of the light L reflected by the reflecting part 8 of the emission unit 2. FIG. 14 is a cross-sectional view showing an optical path of stray light L' of the emission unit 2. FIG. 15 is a cross-sectional view showing a variant of the lighting tool for a vehicle 1. FIG. 16 is a cross-sectional view showing a variant of the lighting tool for a vehicle 1. FIG. 17 is a cross-sectional view showing a configuration of another lighting tool for a vehicle 1A.

In addition, in the drawings described below, an XYZ orthogonal coordinate system is set, an X-axis direction indicates a forward/rearward direction (a lengthwise direction) of the lighting tool for a vehicle 1, a Y-axis direction indicates a leftward/rightward direction (a widthwise direction) of the lighting tool for a vehicle 1, and a Z-axis direction indicates an upward/downward direction (a height direction) of the lighting tool for a vehicle 1.

As shown in FIG. 1 to FIG. 4, the lighting tool for a vehicle 1 of the embodiment includes a plurality of (in the embodiment, three) emission units 2, and has a structure in which the plurality of emission units 2 are integrated while arranged in a widthwise direction.

Each of the emission units 2 includes a light source 3, and a light guide body 4 configured to guide light emitted from the light source 3. The plurality of emission units 2 have a structure in which the light sources 3 and the light guide bodies 4 are arranged side by side in the widthwise direction, and the adjacent light guide bodies 4 are connected.

That is, the light guide body 4 that constitutes each of the emission units 2 is configured by a single light guide member 40 in which adjacent ones are connected to each other. Meanwhile, the light source 3 that constitutes each of the emission units 2 is provided to correspond to each of the light guide bodies 4.

The light source 3 is constituted by an emission element configured to radially emit light L, for example, an LED or the like.

The light source 3 is mounted on one surface (in the embodiment, an upper surface) side of a mounting board (not shown), and radially emits the light L in a direction perpendicular to one surface of the mounting board (in the embodiment, upward).

The light guide body 4 (the light guide member 40) is constituted by a light-transmitting member, for example, a transparent resin such as polycarbonate, acryl, or the like, glass, or the like.

As shown in FIG. 5 to FIG. 8, the light guide body 4 has a first light guide part 5 and a second light guide part 6, the incidence part 7 located at a first end located on one end side (in the embodiment, a lower end side) of the first light guide part 5 and configured to cause the light L emitted from the light source 3 to enter the first light guide part 5, the reflecting part 8 located between a second end located on the other end side (in the embodiment, an upper end side) of the first light guide part 5 and a first end located on one end side (in the embodiment, a rear end side) of the second light guide part 6 and configured to reflect the light L guided into the first light guide part 5 toward the second light guide part 6, and an emitting part 9 located on a second end located on the other end side (in the embodiment, a front end side) of the second light guide part 6 and configured to emit the light L guided into the second light guide part 6 to the outside of the second light guide part 6.

The first light guide part 5 configures a portion that guides the light L entering from the incidence part 7 toward the reflecting part 8. The first light guide part 5 has a width that gradually increases from one end side toward the other end side, and a shape in which both sides in the widthwise direction having an optical axis AX of the light L emitted from the light source 3 interposed between are curved toward one direction (in the embodiment, forward) substantially perpendicular to (in the embodiment, perpendicular to) the optical axis AX. In addition, the first light guide part 5 has a shape with a thickness that gradually increases from one end side toward the other end side.

Further, "one direction" indicates a direction that is a reference of a direction substantially perpendicular to the optical axis AX of the light L emitted from the light source 3. In the embodiment, while one direction is a forward direction (+X-axis direction) of the emission unit 2 (the lighting tool for a vehicle 1), a direction other than the forward direction (+X-axis direction) may be set as the one direction according to an orientation in which the emission unit 2 (the light source 3 and the light guide body 4) is disposed.

In addition, the direction that is approximately perpendicular to the optical axis AX is not limited to only the direction that is perpendicular to the optical axis AX (the direction that is 90° relative to the optical axis AX), but includes, for example, a direction that is 90°±5° relative to the optical axis AX.

The second light guide part 6 configures a portion that guides the light reflected by the reflecting part 8 toward the emitting part 9. The second light guide part 6 has a certain width and thickness corresponding to the reflecting part 8, and has a shape that protrudes in one direction. In addition, the light guide member 40 has a structure in which the second light guide parts 6 of the neighboring light guide bodies 4 are connected.

As shown in FIG. 6 and FIG. 7, the incidence part 7 has an incidence surface 7*a* of a central part on one end side of the first light guide part 5 facing the light source 3.

The incidence surface 7*a* has a shape that curves toward one direction on both sides in the widthwise direction having the optical axis AX interposed between so as to match the shape of one end side of the first light guide part 5. Meanwhile, when the first light guide part 5 is viewed from one direction, i.e., when the light guide body 4 is viewed from the front, the incidence surface 7*a* has a lens shape curved in a concave shape (a concave lens surface). Meanwhile, the incidence surface 7*a* has a lens shape curved in a convex shape (a convex lens surface) in a cross section of the first light guide part 5 in the thickness direction which is parallel to the optical axis AX, i.e., in a vertical cross section of the light guide body 4.

As shown in FIG. 9 and FIG. 10, in the incidence part 7, among the light L radially emitted from the light source 3, the light L passing through the central part of the incidence surface 7*a* in the widthwise direction of the first light guide part 5 enters the inside of the first light guide part 5 with or without being refracted in a direction away from the optical axis AX (hereinafter, referred to as "a diffusion direction"), and the light L passing through the peripheral part of the incidence surface 7*a* enters the inside of the first light guide part 5 while being refracted in a direction approaching the optical axis AX (hereinafter, referred to as "a condensing direction").

That is, in the incidence part 7, a shape of the concave lens surface that configures the incidence surface 7*a* is controlled such that a diffusion degree of the light L radially emitted from the light source 3 is reduced (neighboring intervals of rays are narrowed) as it gets separated away from the optical axis AX in the widthwise direction of the first light guide part 5.

Accordingly, the light L entering the inside of the first light guide part 5 from the incidence surface 7*a* (the incidence part 7) is guided toward the reflecting part 8 while diffusing in the widthwise direction of the first light guide part 5 according to the shape of the first light guide part 5, the width of which gradually increased from one end side toward the other end side of the above mentioned first light guide part 5.

Meanwhile, as shown in FIG. 11 and FIG. 12, in the incidence part 7, the light L entering the incidence surface 7*a* is refracted in the condensing direction in the thickness direction of the first light guide part 5 and enters the inside of the first light guide part 5.

That is, in the incidence part 7, a shape of the convex lens surface that configures the incidence surface 7*a* is controlled such that a condensing degree of the light L radially emitted from the light source 3 is increased as it gets separated away from the optical axis AX in the thickness direction of the first light guide part 5.

Accordingly, the light L entering the inside of the first light guide part 5 from the incidence surface 7*a* (the incidence part 7) is guided toward the reflecting part 8 while diffusing in the widthwise direction of the first light guide part 5 according to the shape of the first light guide part 5, the thickness of which gradually increases from one end side toward the other end side of the first light guide part 5.

As shown in FIG. 5 and FIG. 8, the reflecting part 8 has a reflecting surface 8*a* disposed between the other end side of the first light guide part 5 and one end side of the second light guide part 6 and is inclined toward one direction at a predetermined angle (in the embodiment, 45° with respect to the optical axis AX).

The reflecting surface 8*a* has a shape curved toward one direction on both sides in the widthwise direction across the optical axis AX, according to the shape of the other end side of the first light guide part 5. Meanwhile, the reflecting surface 8*a* has a shape curved in a convex shape in a cross section in the thickness direction of the reflecting part 8 parallel to the optical axis AX. However, since the reflecting surface 8*a* is a surface that totally reflects the light L guided inside the first light guide part 5, the reflecting surface 8*a* is curved into a concave shape with respect to the incident direction of the light L.

As shown in FIG. 13, in the reflecting part 8, the light L entering the reflecting surface 8*a* is reflected toward the second light guide part 6 while condensing in the widthwise direction.

Accordingly, the light L reflected by the reflecting surface 8*a* (the reflecting part 8) is guided from one end side toward the other end side of the second light guide part 6 while parallelizing (collimating) in the widthwise direction of the second light guide part 6.

Meanwhile, in the reflecting part 8, as shown in FIG. 11 and FIG. 12, the light L entering the reflecting surface 8*a* is reflected toward the second light guide part 6 while condensing in the thickness direction.

Accordingly, the light L reflected by the reflecting surface 8*a* (the reflecting part 8) is guided from one end side toward the other end side of the second light guide part 6 while parallelizing (collimating) in the thickness direction of the second light guide part 6.

In addition, in the reflecting part 8, since the light L reflected by the reflecting surface 8*a* is parallelized (collimated) in the thickness direction of the second light guide part 6, the reflecting surface 8*a* may be divided into a plurality of reflecting regions (shown by a broken line in FIG. 12 in the vertical direction), and the light L reflected toward the second light guide part 6 may be parallelized (collimated) while controlling the reflecting direction of the light L entering each of the reflecting region.

As shown in FIG. 5 and FIG. 6, the emitting part 9 has an emitting surface 9*a* on the other end side of the second light guide part 6. The emitting surface 9*a* is constituted by a flat surface (a plane) perpendicular to one direction.

In the emitting part 9, the light L from the emitting surface 9*a* is emitted to the outside of the second light guide part 6 (the light guide body 4). Accordingly, the emitting surface 9*a* can be made to emit light as the emission surface of the lighting tool for a vehicle 1.

Further, the emitting part 9 may have a configuration in which a plurality of diffusion cuts (not shown) configured to diffuse the light L emitted from the emitting surface 9*a* toward the outside are provided.

As the diffusion cut, for example, a concavo-convex structure or the like formed by performing lens cutting referred to as flute cut or fish eye cut, knurling, embossing, or the like, may be exemplified. In addition, by adjusting the shape of this diffusion cut, it is possible to control the diffusion degree of the light L emitted from the emitting surface 9*a*.

In addition, in the lighting tool for a vehicle 1 of the embodiment, as shown in FIG. 15, a diffusion lens 50 may be provided in front of the emitting part 9 to diffuse the light L emitted from the emitting surface 9*a* to the outside. Further, in the lighting tool for a vehicle 1 of the embodiment, as shown in FIG. 16, the diffusion lens 50 and the light guide body 4 may be connected via a connecting part 51.

In the lighting tool for a vehicle 1 of the embodiment having the above-mentioned configuration, without providing a plurality of reflection cuts in the light guide body 4, it is possible to eliminate the luminance difference between the vicinity of the optical axis AX of the light L emitted from the light source 3 and its surroundings, and to guide the light L more uniformly through the light guide body 4.

Accordingly, in the lighting tool for a vehicle 1 of the embodiment, it is possible to allow the emitting surface 9*a* of the light guide body 4 to emit light more uniformly, improving the appearance upon lighting.

In addition, in the lighting tool for a vehicle 1 of the embodiment, it is possible to eliminate the occurrence of luminance (emission) non-uniformity by using one light guide body 4 for the light L emitted from one light source 3 without increasing the number of parts.

Further, in the lighting tool for a vehicle 1 of the embodiment, in order to improve the appearance of the emitting surface 9*a* when viewed from a direction other than the front, in the emission unit 2, for example, as shown in FIG. 14, a surface 4*a* for discharging the stray light L' may be provided midway of the light guide body 4 so that the stray light L', light distribution of which is not controlled, does not reach the emitting surface 9*a*.

Further, the present invention is not necessarily limited to the above-mentioned embodiment, and various modifications may be made without departing from the spirit of the present invention.

For example, in addition to the lighting tool for a vehicle 1, it is possible to adopt the configuration of the other lighting tool for a vehicle 1A as shown in, for example, FIG. 17.

Specifically, the other lighting tool for a vehicle 1A is equipped with a light guide body 4A and a reflector 10 as shown in FIG. 17, instead of the light guide body 4 equipped in the emission unit 2 described above.

The plurality of emission units 2 are arranged side by side in the widthwise direction, and have a structure in which adjacent ones of the light guide bodies 4A are connected to each other, and adjacent ones of the reflectors 10 are connected to each other.

The light guide body 4A has a configuration in which the second light guide part 6, the reflecting part 8 and the emitting part 9 are omitted from the components of the light guide body 4. Meanwhile, the light guide body 4A has a flat (planar) emitting surface 5*a* perpendicular to the optical axis AX on the other end side of the first light guide part 5.

The reflector 10 has a reflecting surface 10*a* facing the emitting surface 5*a* of the first light guide part 5. Like the reflecting surface 8*a*, the reflecting surface 10*a* has a shape curved toward one direction on both sides in the widthwise direction having the optical axis AX interposed between according to the shape of the other end side (the emitting surface 5*a*) of the first light guide part 5. Meanwhile, the reflecting surface 10*a* has a shape curved in a concave shape in a cross section in the thickness direction of the reflector 10 parallel to the optical axis AX.

In the lighting tool for a vehicle 1A having the above-mentioned configuration, the light L emitted from the emitting surface 5*a* of the first light guide part 5 is reflected in one direction by the reflecting surface 10*a* of the reflector 10.

Even in the case of the configuration, like the lighting tool for a vehicle 1, without providing a plurality of reflection cuts in the light guide body 4A, it is possible to eliminate the luminance difference between the vicinity of the optical axis AX of the light L emitted from the light source 3 and its surroundings and uniformly reflecting the light in one direction using the reflecting surface 10*a* of the reflector 10 while guiding more uniform light L through the light guide body 4A.

Accordingly, in the lighting tool for a vehicle 1A, the front side of the reflector 10 can be used as the emission surface to emit light uniformly, improving the appearance upon lighting.

In addition, the diffusion lens 50 may be provided in front of the reflector 10 to diffuse the light L reflected by the reflecting surface 10*a* of the reflector 10.

Further, the orientation in which the lighting tool for a vehicle 1 or 1A is disposed is not particularly limited, and for example, it is possible to dispose the lighting tool for a vehicle 1 with the upward/downward direction reversed, or to dispose the lighting tool for a vehicle 1 with the upward/downward direction sideways.

In addition, in the lighting tool for a vehicle 1 or 1A, the emitting surface 9*a* (the emitting part 9) is provided on the other end side of the second light guide part 6. In this case, the direction (forward) of the light L emitted from the emitting surface 9*a* (the emitting part 9) coincides with the one direction.

Meanwhile, the light guide body 4 may be extended by adding another reflecting surface (reflecting part) or light guide part between the other end side of the second light guide part 6 and the emitting surface 9*a* (the emitting part 9). In this case, finally, the direction (forward) of the light L emitted from the emitting surface 9*a* (the emitting part 9) may be different from the one direction.

Further, the lighting tool for a vehicle to which the present invention is applied is not particularly limited, and the present invention can be widely applied to, for example, taillights (tail lamps), sidelights (position lamps), brake lamps, back lamps, daytime running lights (DRLs), direction indicators (blinker lamps), side marker lamps, and the like.

In addition, the color of the light emitted by the light source 3 can be changed appropriately depending on the purpose of the lighting tool for a vehicle, such as red light, white light, orange light, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:

a light source;

a light guide part configured to guide light emitted from the light source from a first end located on one end side to a second end located on the other end side;

an incidence part configured to cause the light emitted from the light source to enter inside of the light guide part from the first end of the light guide part; and a reflecting part configured to reflect light guided toward the second end of the light guide part in one direction substantially perpendicular to an optical axis of the light emitted from the light source, wherein the light guide part has a width that gradually increases from the first end toward the second end and a shape in which both sides of the light guide part in a widthwise direction having the optical axis interposed between are curved toward the one direction, the incidence part has an incidence surface located in a central part of the first end of the light guide part and facing the light source, the incidence surface has a shape in which both sides of the incidence surface in the widthwise direction having the optical axis interposed between are curved toward the one direction, curved in a concave shape when the light guide part is seen from the one direction, and curved in a convex shape in a cross section in a thickness direction of the light guide part parallel to the optical axis, the reflecting part has a reflecting surface inclined toward the one direction on the second end of the light guide part, and the reflecting surface has a shape in which both sides of the reflecting surface in the widthwise direction having the optical axis interposed between are curved toward the one direction.

2. The lighting tool for a vehicle according to claim 1, wherein the light guide part has a shape, a thickness of which gradually increases from the first end toward the second end, and the reflecting surface has a shape curved in a convex shape in a cross section in the thickness direction of the reflecting part parallel to the optical axis.

3. The lighting tool for a vehicle according to claim 1, comprising a light guide body including the light guide part, the incidence part and the reflecting part, wherein the light guide body includes a light guide part configured to guide the light reflected by the reflecting part in the one direction, and an emitting part configured to emit the light guided in the one direction to outside of the light guide part.

4. The lighting tool for a vehicle according to claim 3, wherein the emitting part has a flat emitting surface perpendicular to the one direction.

5. The lighting tool for a vehicle according to claim 3, comprising a plurality of emission units including the light sources and the light guide bodies, wherein the plurality of emission units are arranged side by side in the widthwise direction, and have a structure in which the adjacent light guide bodies are connected to each other.

6. The lighting tool for a vehicle according to claim 1, comprising:

a light guide body including the light guide part and the incidence part; and a reflector that configures the reflecting part, wherein the reflector has the reflecting surface facing the second end of the light guide part.

7. The lighting tool for a vehicle according to claim 6, comprising a plurality of emission units including the light sources, the light guide bodies and the reflectors, wherein the plurality of emission units are disposed side by side in the widthwise direction and have a structure in which adjacent light guide bodies are connected to each other and the adjacent reflectors are connected to each other.

* * * * *